(12) United States Patent
Adachi (10) Patent No.: US 9,881,743 B2
(45) Date of Patent: Jan. 30, 2018

(54) GLASS CERAMIC MATERIAL AND MULTILAYER CERAMIC ELECTRONIC COMPONENT

(71) Applicant: MURATA MANUFACTURING CO., LTD., Kyoto-fu (JP)

(72) Inventor: Hiroshige Adachi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 26 days.

(21) Appl. No.: 15/149,390

(22) Filed: May 9, 2016

(65) Prior Publication Data

US 2016/0254096 A1   Sep. 1, 2016

Related U.S. Application Data

(63) Continuation of application No. PCT/JP2014/071821, filed on Aug. 21, 2014.

(30) Foreign Application Priority Data

Dec. 19, 2013   (JP) .................................. 2013-262310

(51) Int. Cl.
   *H01G 4/40*   (2006.01)
   *C03C 8/14*   (2006.01)
   (Continued)

(52) U.S. Cl.
   CPC ............... *H01G 4/40* (2013.01); *B32B 18/00* (2013.01); *C03C 3/089* (2013.01); *C03C 3/091* (2013.01);
   (Continued)

(58) Field of Classification Search
   CPC ........ H01G 4/40; H01G 4/1209; H01G 4/129; H01G 4/30; B32B 18/00; C03C 3/089;
   (Continued)

(56) References Cited

U.S. PATENT DOCUMENTS 4,849,379 A   7/1989   McCormick
5,206,620 A *  4/1993   Watanabe ............... C04B 35/26
                                                    252/62.58
(Continued)

FOREIGN PATENT DOCUMENTS

CN   102186792 A   9/2011
JP   H01-226751 A  9/1989
(Continued)

OTHER PUBLICATIONS

International Search Report—PCT/JP2014/071821 dated Nov. 18, 2014.
(Continued)

*Primary Examiner* — Dion R Ferguson
(74) *Attorney, Agent, or Firm* — Studebaker & Brackett PC (57) ABSTRACT

A first ceramic layer of a composite laminate included in a common mode choke coil is formed from a sintered body of a glass ceramic material. The glass ceramic material contains 40 to 90 percent by weight of a glass which contains 0.5 to 5 percent by weight of $K_2O$, 0 to 5 percent by weight of $Al_2O_3$, 10 to 25 percent by weight of $B_2O_3$, and 70 to 85 percent by weight of $SiO_2$; and 10 to 60 percent by weight of a filler containing alumina and quartz, and the content of the alumina contained in the filler is 1 to 10 percent by weight of the total amount of the glass and the filler.

10 Claims, 5 Drawing Sheets

(51) Int. Cl.

| | | |
|---|---|---|
| *C03C 3/091* | (2006.01) | |
| *H01G 4/30* | (2006.01) | |
| *H01G 4/12* | (2006.01) | |
| *B32B 18/00* | (2006.01) | |
| *C03C 3/089* | (2006.01) | |
| *C03C 14/00* | (2006.01) | |
| *H01F 17/04* | (2006.01) | |
| *C04B 35/18* | (2006.01) | |
| *C03C 10/00* | (2006.01) | |
| *H01F 27/245* | (2006.01) | |
| *H01F 27/28* | (2006.01) | |

(52) U.S. Cl.
CPC ............ *C03C 8/14* (2013.01); *C03C 10/0009* (2013.01); *C03C 10/0018* (2013.01); *C03C 10/0054* (2013.01); *C03C 14/004* (2013.01); *C04B 35/18* (2013.01); *H01F 17/04* (2013.01); *H01F 27/245* (2013.01); *H01F 27/2804* (2013.01); *H01G 4/1209* (2013.01); *H01G 4/129* (2013.01); *H01G 4/30* (2013.01); *C03C 2204/00* (2013.01); *C04B 2235/3217* (2013.01); *C04B 2235/3418* (2013.01); *C04B 2235/36* (2013.01); *C04B 2235/6025* (2013.01); *C04B 2237/34* (2013.01); *C04B 2237/341* (2013.01); *C04B 2237/68* (2013.01); *C04B 2237/704* (2013.01)

(58) Field of Classification Search
CPC ....... C03C 3/091; C03C 8/14; C03C 10/0009; C03C 10/0018; C03C 10/0054; C03C 14/004; C03C 2204/00; H01F 17/04; H01F 27/245; H01F 27/2804; C04B 2235/3217; C04B 35/18; C04B 2235/3418; C04B 2235/36; C04B 2235/6025; C04B 2237/34; C04B 2237/341; C04B 2237/68; C04B 2237/704

See application file for complete search history.

(56) References Cited

U.S. PATENT DOCUMENTS

| | | | |
|---|---|---|---|
| 2008/0053592 A1* | 3/2008 | Khadilkar | C03C 3/062 156/89.11 |
| 2011/0181384 A1 | 7/2011 | Inuduka et al. | |
| 2012/0319060 A1* | 12/2012 | Umayahara | C03C 14/004 252/582 |
| 2013/0093557 A1* | 4/2013 | Odahara | H01F 27/2804 336/200 |
| 2014/0191838 A1* | 7/2014 | Yoshida | H01F 17/0013 336/200 |
| 2014/0362491 A1* | 12/2014 | Adachi | H01G 4/105 361/270 |
| 2016/0133376 A1* | 5/2016 | Yamauchi | H01F 27/2804 336/192 |
| 2017/0103846 A1* | 4/2017 | Yoneda | H01F 27/2804 |

FOREIGN PATENT DOCUMENTS

| | | |
|---|---|---|
| JP | 07-038214 A | 2/1995 |
| JP | H09-241068 A | 9/1997 |
| JP | H10-194828 A | 7/1998 |
| JP | 2002-324730 A | 11/2002 |
| JP | 2013-056784 A | 3/2013 |
| JP | 2014-152059 A | 8/2014 |
| WO | 2010/044213 A1 | 4/2010 |

OTHER PUBLICATIONS

Written Opinion—PCT/JP2014/071821 dated Nov. 18, 2014.
International Preliminary Report on Patentability of the International Searching Authority; PCT/JP2014/071821 dated Jun. 21, 2016.

\* cited by examiner

GLASS CERAMIC MATERIAL AND MULTILAYER CERAMIC ELECTRONIC COMPONENT

CROSS REFERENCE TO RELATED APPLICATIONS

This application claims benefit of priority to Japanese Patent Application 2013-262310 filed Dec. 19, 2013, and to International Patent Application No. PCT/JP2014/071821 filed Aug. 21, 2014, the entire content of which is incorporated herein by reference.

TECHNICAL FIELD

The present disclosure relates to a glass ceramic material and a multilayer ceramic electronic component formed using the same.

BACKGROUND

As an interesting technique relating to the present disclosure, for example, a technique disclosed in Japanese Unexamined Patent Application Publication No. 2013-56784 may be mentioned. Japanese Unexamined Patent Application No. 2013-56784 has disclosed a glass ceramic dielectric material used for a semiconductor wiring board, a circuit board, and the like. In more particular, this glass ceramic dielectric material contains 49.9 to 89.9 percent by mass of a borosilicate glass powder, 10 to 50 percent by mass of an alumina powder and/or a quartz powder, and a 0.1 to 4 percent by mass of an aluminum borate powder and/or a silica borate-based compound powder.

Since the glass ceramic dielectric material described above can be sintered at a relatively low temperature, such as 1,000° C. or less, simultaneous sintering (co-sintering) can be advantageously performed together with an electrically conductive material, such as silver or copper, which has a low melting point and a low conductor loss and which is to be used as a material of an electrode layer.

In addition, as a composite electronic component, there may be mentioned a multilayer ceramic electronic component which includes a composite laminate formed by laminating a plurality of types of ceramics layers formed of ceramic materials having compositions different from each other. In manufacturing of the multilayer ceramic electronic component as described above, in order to shorten a manufacturing time therefor, it has been desired that not only a ceramic material and an electrically conductive material but also a plurality of types of ceramics materials having compositions different from each other can be co-sintered and that, furthermore, desired characteristics can be satisfied.

SUMMARY

Technical Problem

However, when a composite laminate is formed using the glass ceramic dielectric material described in Japanese Unexamined Patent Application No. 2013-56784, in more particular, of a first and a second ceramic layer contained in the composite laminate, when the first ceramic layer is formed from the glass ceramic dielectric material described in Japanese Unexamined Patent Application No. 2013-56784, and when the second ceramic layer is a magnetic layer formed, for example, from a ferrite, the counter diffusion between the first ceramic layer and the second ceramic layer is difficult to be controlled during co-sintering.

Hence, the diffusion of a glass component from the first ceramic layer formed from the glass ceramic dielectric material to the magnetic layer used as the second ceramic layer cannot be avoided. In addition, it has been known that the diffusion of a glass component, in particular, the diffusion of Si, to a magnetic layer degrades the sintering properties of ferrite. As a result, the magnetic layer is not sufficiently sintered, and the insulating resistance characteristics of a multilayer ceramic electronic component including the composite laminate as described above may be degraded in some cases.

Accordingly, the present disclosure aims to provide a glass ceramic material capable of resolving the problem as described above and a multilayer ceramic electronic component formed using the same.

Solution to Problem

The present disclosure is directed, first, to a glass ceramic material which can be advantageously used to form a part of a composite laminate included in a multilayer ceramic electronic component. The glass ceramic material according to the present disclosure comprises:

40 to 90 percent by weight of a glass containing 0.5 to 5 percent by weight of $K_2O$, 0 to 5 percent by weight of $Al_2O_3$, 10 to 25 percent by weight of $B_2O_3$, and 70 to 85 percent by weight of $SiO_2$; and 10 to 60 percent by weight of a filler containing alumina and quartz.

In addition, as a primary feature of the present disclosure, the content of the alumina contained in the filler is 1 to 10 percent by weight of the total amount of the glass and the filler.

According to the glass ceramic material described above, it is supposed that since the alumina functioning as a filler component partially reacts with the glass during firing and is then incorporated as a part of the glass composition, the glass viscosity is increased.

The present disclosure is also directed to a multilayer ceramic electronic component including a composite laminate which has the structure formed by laminating a first ceramic layer and at least one second ceramic layer having a composition different from that of the first ceramic layer and which is obtained by co-sintering of the first ceramic layer and the second ceramic layer. The present disclosure is characterized in that the first ceramic layer is formed from a sintered body of the glass ceramic material according to the present disclosure.

As described above, since the glass viscosity of the glass ceramic material which forms the first ceramic layer is increased during firing, the diffusion of the glass component from the first ceramic layer to the second ceramic layer can be made unlikely to occur. In addition, in association with that described above, component diffusion from the second ceramic layer to the first ceramic layer can also be made unlikely to occur.

In particular, the present disclosure can be advantageously applied when the second ceramic layer is formed from a ceramic magnetic material containing a Ni—Cu—Zn-based ferrite. Since the sintering properties of ferrite tend to be degraded by diffusion of Si thereto, the suppression of diffusion of the glass component to the second ceramic layer is significant as described above.

The present disclosure can be advantageously applied to a multilayer ceramic electronic component which further comprises at least one pair of terminal electrodes formed on at least one external surface of the composite laminate and in which on a path of current flowing between the pair of terminal electrodes, the interface between the first ceramic layer and the second ceramic layer is present.

Undesired counter diffusion has an adverse influence on the electric characteristics at the interface between the first and the second ceramic layer and in the vicinity thereof and more particularly, has a more serious influence on the insulating resistance. Hence, as described above, when the interface of the first ceramic layer and the second ceramic layer is present on the path of current flowing between the pair of terminal electrodes, the electric characteristics, such as the insulating resistance, adversely influenced by the counter diffusion is observed between the pair of terminal electrodes, and degradation in characteristics of the multilayer ceramic electronic component itself may arise in some cases. Hence, the effect of suppressing the diffusion of the glass component to the second ceramic layer according to the present disclosure becomes more particularly significant in the multilayer ceramic electronic component in which the interface between the first ceramic layer and the second ceramic layer is present on the path of current flowing between the pair of terminal electrodes.

In the multilayer ceramic electronic component according to the present disclosure, at least one coil conductor is preferably provided in the first ceramic layer. In this case, in the composite laminate, when the second ceramic layers are laminated so as to sandwich the first ceramic layer, for example, a common mode choke coil can be advantageously formed.

In addition, in the multilayer ceramic electronic component according to the present disclosure, when at least one pair of capacitor electrodes is provided in the first ceramic layer, and at least one coil conductor is provided in the second ceramic layer, for example, an LC filter can be advantageously formed.

Advantageous Effects of Disclosure

According to the glass ceramic material of the present disclosure, the diffusion of the glass component from the first ceramic layer formed from the above glass ceramic material to the second ceramic layer adjacent to the first ceramic layer can be made unlikely to occur during firing.

Hence, in the multilayer ceramic electronic component including the composite laminate which has the structure formed by laminating the first ceramic layer and the second ceramic layer having a composition different from that of the first ceramic layer and which is obtained by co-sintering of the first ceramic layer and the second ceramic layer, when the first ceramic layer is formed from the sintered body of the glass ceramic material described above, during a firing step of obtaining the composite laminate, the diffusion of the glass component from the first ceramic layer to the second ceramic layer can be made unlikely to occur. In addition, conversely, the diffusion from the second ceramic layer to the first ceramic layer can also be made unlikely to occur.

As a result, undesired variation in electric characteristics of each of the first ceramic layer and the second ceramic layer can be made unlikely to occur, and the degradation in characteristics and reliability of the multilayer ceramic electronic component can be suppressed.

In particular, when the second ceramic layer is made from a ceramic magnetic material containing a Ni—Cu—Zn-based ferrite, since the diffusion of the glass component to the second ceramic layer degrades the sintering properties of the second ceramic layer, the insulating resistance at the interface between the first ceramic layer and the second ceramic layer and in the vicinity thereof is liable to be degraded. Hence, when the second ceramic layer is formed from a ceramic magnetic material containing a Ni—Cu—Zn-based ferrite, the effect of suppressing the diffusion of the glass component described above is more significant.

BRIEF DESCRIPTION OF DRAWINGS

FIGS. 5(A), 5(B) and 5(C) include views showing a capacitor 41 which is formed in an experimental example and which includes a laminate 42 in which ceramic layers formed using a glass ceramic material are only laminated to each other.

FIGS. 6(A), 6(B), and 6(C) include views showing a capacitor 51 which is formed in an experimental example and which includes a composite laminate 52 in which a first ceramic layer 53 formed using a glass ceramic material and ceramic layers 54 each formed from a ceramic magnetic material containing a Ni—Cu—Zn-based ferrite are laminated to each other.

DETAILED DESCRIPTION

Figure 1:
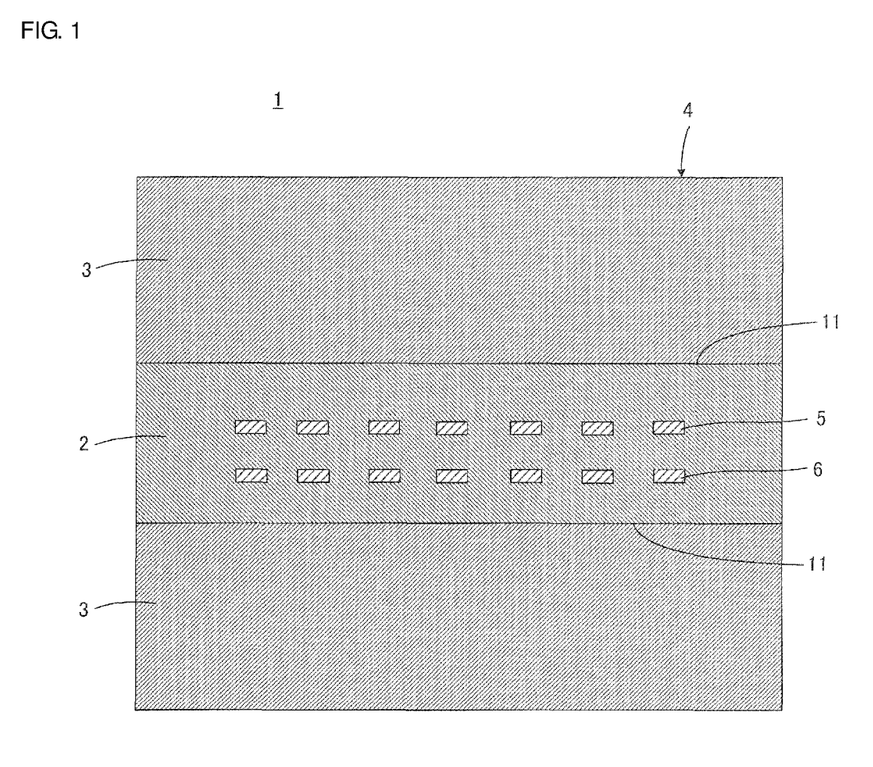
FIG. 1 is a cross-sectional view showing a common mode choke coil 1 as a multilayer ceramic electronic component according to a first embodiment of the present disclosure.

With reference to FIG. 1, as a multilayer ceramic electronic component according to a first embodiment of the present disclosure, a common mode choke coil 1 will be described.

The common mode choke coil 1 includes a composite laminate 4 having the structure formed by laminating a first ceramic layer 2 formed from a glass ceramic material according to the present disclosure and second ceramic layers 3 each formed from a ceramic magnetic material. In this embodiment, the two second ceramic layers 3 are laminated to each other so as to sandwich the first ceramic layer 2. The composite laminate 4 is obtained by co-sintering of the first ceramic layer 2 and the second ceramic layers 3.

In addition, although the first ceramic layer 2 and the second ceramic layer 3 are each shown as one layer, the layers described above each actually have a multilayer structure formed from a plurality of layers.

Figure 2:
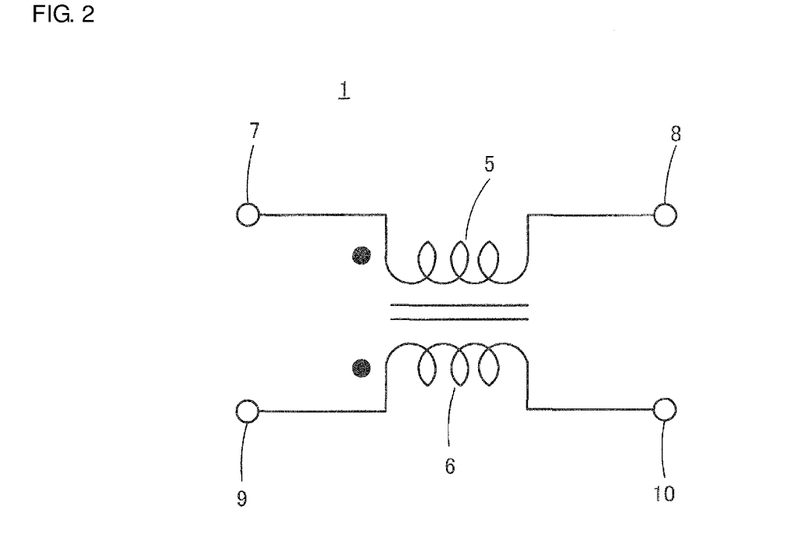
FIG. 2 is an equivalent circuit diagram of the common mode choke coil 1 shown in FIG. 1.

An equivalent circuit diagram of the common mode choke coil 1 shown in FIG. 1 is shown in FIG. 2. The common mode choke coil 1 includes two coil conductors 5 and 6 each extending to form a coil shape. These coil conductors 5 and 6 are provided in the first ceramic layer 2 so as to face each other. Terminal electrodes 7 and 8 are electrically connected to the respective terminals of the first coil conductor 5, and terminal electrodes 9 and 10 are electrically connected to the respective terminals of the second coil conductor 6.

Although not shown in FIG. 1, the terminal electrodes 7 to 10 are provided on external surfaces of the composite laminate 4. On a path of current flowing between a pair of terminal electrodes among the terminal electrodes 7 to 10 described above, an interface 11 between the first ceramic layer 2 and the second ceramic layer 3 is present.

In the composite laminate 4, the dielectric constant of the first ceramic layer 2 is lower than that of the second ceramic layer 3. In the common mode choke coil 1 thus shown, the coil conductors 5 and 6 are disposed in the first ceramic layer 2 having a relatively low dielectric constant of the composite laminate 4. The structure as described above contributes to the improvement in characteristics of the common mode choke coil 1.

As described above, the first ceramic layer 2 is a layer formed from a sintered body of the glass ceramic material according to the present disclosure. This glass ceramic material contains:

40 to 90 percent by weight of a glass containing 0.5 to 5 percent by weight of $K_2O$, 0 to 5 percent by weight of $Al_2O_3$, 10 to 25 percent by weight of $B_2O_3$, and 70 to 85 percent by weight of $SiO_2$; and 10 to 60 percent by weight of a filler containing alumina and quartz.

In addition, as one feature of the present disclosure, the content of the alumina contained in the filler is 1 to 10 percent by weight of the total amount of the glass and the filler.

The second ceramic layer 3 is preferably formed from a ceramic magnetic material containing a Ni—Cu—Zn-based ferrite.

Next, a preferable method for manufacturing the common mode choke coil 1 will be described.

First, glass ceramic green sheets which contain a glass ceramic material and which are to be formed into the first ceramic layer 2 and magnetic ceramic green sheets which contain a magnetic material and which are formed into the second ceramic layer 3 are prepared.

Next, on the glass ceramic green sheets, electrically conductive films to be formed into the coil conductor 5 and, if needed, via conductors are formed, for example, by printing an electrically conductive paste.

Subsequently, in order to obtain the composite laminate in which the second ceramic layers 3 are laminated to each other so as to sandwich the first ceramic layer 2, a required number of glass ceramic green sheets and a required number of magnetic ceramic green sheets are laminated to each other in a predetermined order. Accordingly, a green laminate to be formed into the composite laminate 4 is obtained.

Next, the green laminate is fired, and as a result, the composite laminate 4 is obtained. In this firing step, the following phenomenon is supposed to occur. The alumina which is a filler component in the glass ceramic material contained in the glass ceramic green sheet partially reacts with the glass in the glass ceramic material during the firing and is then incorporated as a part of the glass composition. By this phenomenon, the glass viscosity is increased. Hence, the glass component is not likely to be diffused to the magnetic ceramic green sheet or the second ceramic layer 3, and in association therewith, the component diffusion from the magnetic ceramic green sheet or the second ceramic layer 3 to the glass ceramic green sheet or the first ceramic layer 2 is also not likely to occur.

As a result, in the composite laminate 4 obtained after the firing step, the decrease in insulating resistance at the interface 11 between the first ceramic layer 2 and the second ceramic layer 3 and in the vicinity thereof can be suppressed. In particular, when the second ceramic layer 3 is formed from a ceramic magnetic material containing a Ni—Cu—Zn-based ferrite, due to the diffusion of glass to the second ceramic layer 3, in particular, due to the diffusion of Si, the sintering properties tend to be degraded; hence, the suppression of the diffusion of the glass component described above is significant.

In addition, in order to obtain the composite laminate 4, even when the first ceramic layer 2 and the second ceramic layer 3 are co-sintered as described above, defects, such as cracks and peeling, are not generated.

Subsequently, on the external surfaces of the composite laminate 4, the terminal electrodes 7 to 10 are formed, for example, by application and firing of an electrically conductive paste, so that the common mode choke coil 1 is obtained. In addition, the terminal electrodes 7 to 10 may be formed in such a way that after an electrically conductive paste is applied on external surfaces of the green laminate and is then simultaneously fired in the firing step of obtaining the composite laminate 4.

Next, with reference to FIG. 3, as a multilayer ceramic electronic component according to a second embodiment of the present disclosure, an LC filter 21 will be described.

The LC filter 21 includes a composite laminate 24 having the structure formed by laminating a first ceramic layer formed from a sintered body of the glass ceramic material according to the present disclosure and a second ceramic layer 23 formed from a ceramic magnetic material containing a Ni—Cu—Zn-based ferrite or the like so as to be adjacent to each other. The composite laminate 24 is obtained by co-sintering of the first ceramic layer 22 and the second ceramic layer 23.

In this embodiment, although not shown in the drawings, the first ceramic layer 22 and the second ceramic layer 23 each also actually have a multilayer structure formed of a plurality of layers.

Figure 3:
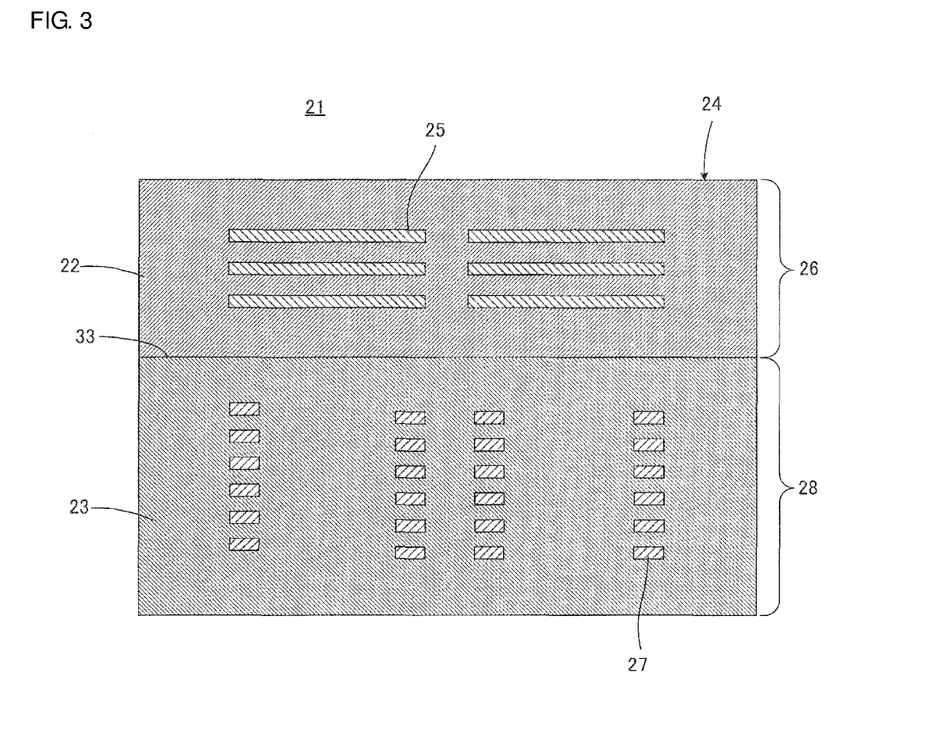
FIG. 3 is a cross-sectional view showing an LC filter 21 as a multilayer ceramic electronic component according to a second embodiment of the present disclosure.
Figure 4:
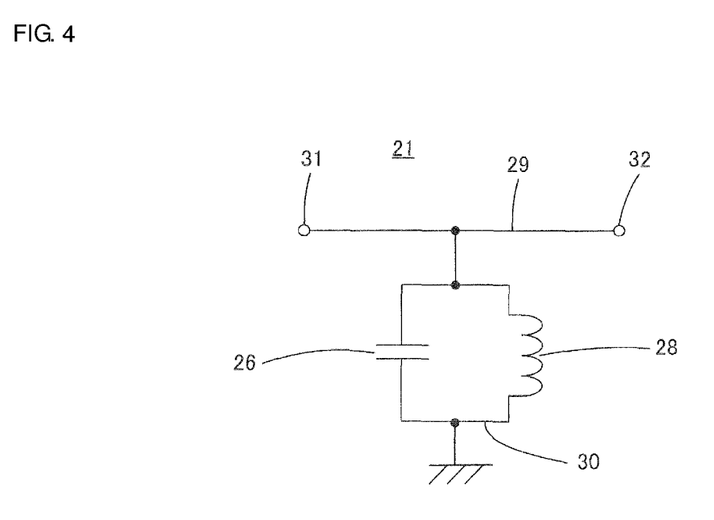
FIG. 4 is an equivalent circuit diagram of the LC filter 21 shown in FIG. 3.

One example of an equivalent circuit diagram of the LC filter 21 shown in FIG. 3 is shown in FIG. 4. As shown in FIG. 3, in the first ceramic layer 22, a plurality of capacitor electrodes 25 are provided so as to face each other, and by this arrangement, a capacitor 26 shown in FIG. 4 is formed. In addition, in the second ceramic layer 23, coil conductors 27 extending to form a coil shape are provided, and by this arrangement, an inductor 28 shown in FIG. 4 is obtained.

As shown in FIG. 4, the LC filter 21 further includes connection conductors 29 and 30 connecting the capacitor 26 and the inductor 28, terminal electrodes 31 and 32 each functioning as an input-output terminal, and a terminal electrode 33 functioning as an earth terminal. Although the connection conductors 29 and 30 and the terminal electrodes 31 to 33 are not shown in FIG. 3, the terminal electrodes 31 to 33 are provided on external surfaces of the composite laminate 4. An interface 34 between the first ceramic layer 22 and the second ceramic layer 23 is present on a path of current flowing between a pair of terminal electrodes among the terminal electrodes 31 to 33.

In manufacturing of the LC filter 21, substantially the same process as that in the case of the common mode choke coil 1 is performed. Accordingly, in a firing step of firing a green laminate, since the alumina which is a filler component in the glass ceramic material contained in a glass ceramic green sheet to be formed into the first ceramic layer 22 partially reacts with the glass and is then incorporated as part of the glass composition, and the glass viscosity is increased thereby, the glass component is not likely to be diffused to a magnetic green sheet to be formed into the second ceramic layer 23. As a result, in the composite laminate 24 obtained after the firing step is performed, the decrease in insulating resistance at the interface 34 between the first ceramic layer 22 and the second ceramic layer 23 and in the vicinity thereof can be suppressed.

Heretofore, although the present disclosure has been described in connection with the common mode choke coil 1 and the LC filter 21 shown in the drawings, as long as the multilayer ceramic electronic component has the composite laminate which has the structure formed by laminating the first ceramic layer and the second ceramic layer having a composition different from that of the first ceramic layer and which is obtained by co-sintering of the first ceramic layer and the second ceramic layer, the present disclosure may be applied to any type of multilayer ceramic electronic components regardless of the structures or the functions thereof.

Hence, as long as the first ceramic layer is formed from a sintered body of the glass ceramic material according to the present disclosure, the present disclosure may be applied not only to the case in which the second ceramic layer is formed from a ceramic magnetic material but also to the case in which the second ceramic layer is formed from another ceramic material.

EXAMPLES

Hereinafter, experimental examples performed to define the range of the present disclosure will be described.

(1) Formation of Glass Ceramic Green Sheet

In order to obtain a glass composition shown in Table 1, after oxides or carbonates used as a starting raw material were blended together and then placed in a Pt crucible, fusion was performed for 2 hours. A most suitable fusion temperature was selected from a range of 1,500° C. to 1,600° C. in accordance with the glass composition. After this glass melt was rapidly cooled, a glass powder was obtained by pulverization.

In addition, as a ceramic powder used as a filler, as shown in Table 1, an alumina powder and a quartz powder were prepared and weighed to have a weight ratio shown in Table 1.

Subsequently, the glass powder and the ceramic powder were mixed together at the rate shown by the "glass amount" and the "filler amount" in Table 1, so that a glass ceramic material of each sample was formed. In addition, after a solvent, a binder, and a plasticizer were added to each glass ceramic material and were then sufficiently mixed together, by using a doctor blade method, a glass ceramic green sheet was obtained.

In addition, in Table 1, the weight ratios of alumina and quartz, which were used as the filler, are each shown by the weight ratio with respect to the total amount of the glass and the filler.

TABLE 1

| SAMPLE No. | GLASS | | | | | FILLER | | |
|---|---|---|---|---|---|---|---|---|
| | COMPOSITION | | | | | | | FILLER |
| | $K_2O$ (Wt %) | $Al_2O_3$ (Wt %) | $B_2O_3$ (Wt %) | $SiO_2$ (Wt %) | GLASS AMOUNT | ALUMINA (Wt %) | QUARTZ (Wt %) | AMOUNT (Wt %) |
| *1 | 0.2 | 0 | 20 | 79.8 | 80 | 5 | 15 | 20 |
| 2 | 0.5 | 0 | 20 | 79.5 | 75 | 5 | 20 | 25 |
| 3 | 5 | 0 | 20 | 75 | 60 | 5 | 35 | 40 |
| *4 | 5.5 | 0 | 20 | 74.5 | 55 | 5 | 40 | 45 |
| 5 | 2 | 0 | 20 | 78 | 65 | 5 | 30 | 35 |
| 6 | 2 | 5 | 20 | 73 | 65 | 5 | 30 | 35 |
| *7 | 2 | 10 | 15 | 73 | 65 | 5 | 30 | 35 |
| *8 | 2 | 0 | 8 | 90 | 65 | 5 | 30 | 35 |
| 9 | 2 | 0 | 10 | 88 | 75 | 5 | 20 | 25 |
| 10 | 2 | 0 | 25 | 73 | 60 | 5 | 35 | 40 |
| *11 | 2 | 0 | 28 | 70 | 65 | 5 | 30 | 35 |
| *12 | 4 | 3 | 25 | 68 | 65 | 5 | 30 | 35 |
| 13 | 3 | 2 | 25 | 70 | 60 | 5 | 35 | 40 |
| 14 | 2 | 0 | 13 | 85 | 75 | 5 | 20 | 25 |
| *15 | 2 | 0 | 10 | 88 | 65 | 5 | 30 | 35 |
| *16 | 2 | 0 | 20 | 78 | 55 | 12 | 33 | 45 |
| 17 | 2 | 0 | 20 | 78 | 60 | 10 | 30 | 40 |
| 18 | 2 | 0 | 20 | 78 | 65 | 1 | 34 | 35 |
| *19 | 2 | 0 | 20 | 78 | 65 | 0 | 35 | 35 |
| *20 | 2 | 0 | 20 | 78 | 35 | 5 | 60 | 65 |
| 21 | 3 | 0 | 22 | 75 | 40 | 5 | 55 | 60 |
| 22 | 2 | 0 | 18 | 80 | 90 | 5 | 5 | 10 |
| *23 | 2 | 0 | 20 | 78 | 95 | 2 | 3 | 5 |
| 24 | 2 | 0 | 20 | 78 | 65 | 5 | 30 | 35 |

In Table 1 and the following Table 2, the sample No. with * indicates a comparative example which is out of the range of the present disclosure.

(2) Formation of Magnetic Ceramic Green Sheet

After a solvent, a binder, and a plasticizer were added to a calcined powder of a Ni—Cu—Zn-based ferrite and were then sufficiently mixed together, by using a doctor blade method, a magnetic ceramic green sheet was obtained.

By the use of the glass ceramic green sheet and the magnetic ceramic green sheet thus obtained, the following evaluation was performed.

(3) Formation of Capacitor to be Used as Sample

Figure 5A:
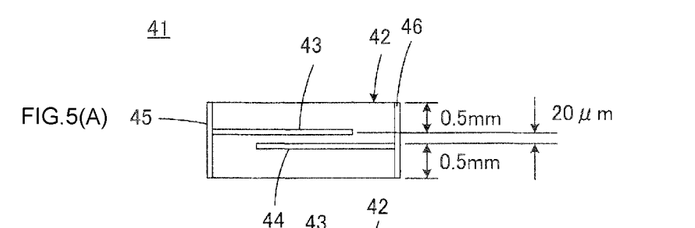
FIG. 5(A) is a cross-sectional view taken along the thickness direction of the laminate 42.
Figure 5B:
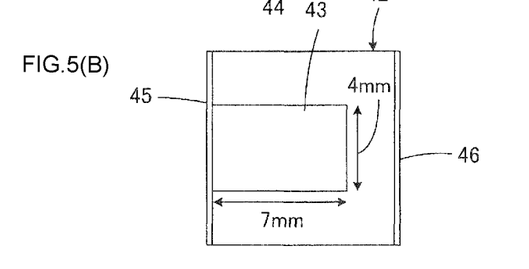
FIG. 5(B) is a cross-sectional view along the plane on which a first capacitor electrode 43 is extended.
Figure 5C:
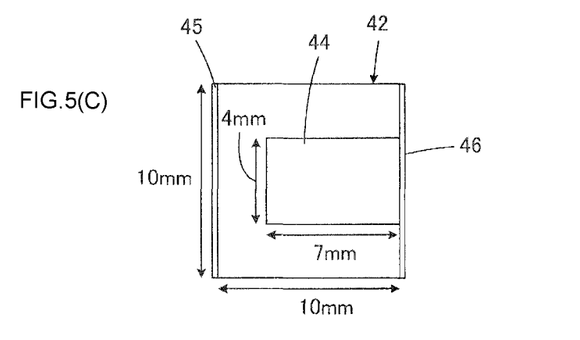
FIG. 5(C) is a cross-sectional view along the plane on which a second capacitor electrode 44 is extended.
Figure 6A:
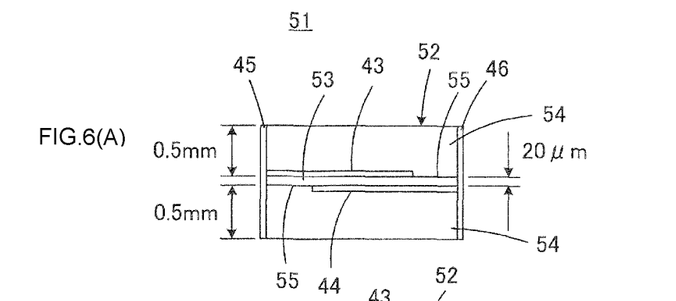
FIG. 6(A) is a cross-sectional view taken along the thickness direction of the composite laminate 52.
Figure 6B:
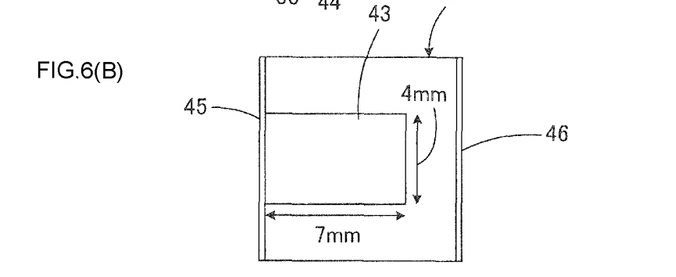
FIG. 6(B) is a cross-sectional view along the plane on which a first capacitor electrode 43 is extended.
Figure 6C:
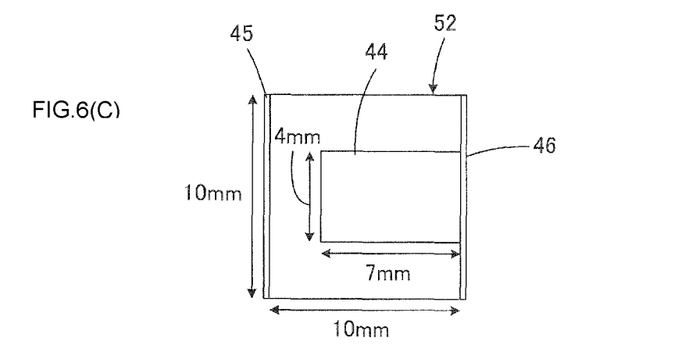
FIG. 6(C) is a cross-sectional view along the plane on which a second capacitor electrode 44 is extended.

As a sample, a capacitor 41 and a capacitor 51 as shown in FIGS. 5 and 6, respectively, were formed.

<Common Structure of Capacitors 41 and 51>

The capacitors 41 and 51 had a laminate 42 and a laminate 52, respectively. In the capacitors 41 and 51, when common elements are described using reference numerals similar to each other, in each of the laminates 42 and 52, a first capacitor electrode 43 and a second capacitor electrode 44 facing thereto were provided. On end surfaces facing each other of each of the laminates 42 and 52, a first terminal electrode 45 and a second terminal electrode 46 electrically connected to the first capacitor electrode 43 and the second capacitor electrode 44, respectively, were formed.

As shown in FIGS. 5 and 6, the capacitor electrodes 43 and 44 each had a plane dimension of 4 mm×7 mm and faced each other in a region of 4 mm×4 mm, and the distance between the capacitor electrodes 43 and 44 was set to 20 μm.

In addition, in order to form the capacitor electrodes 43 and 44, an Ag-based paste was used. In addition, in order to obtain the laminates 42 and 52, the firing temperature was set to 920° C. or less.

<Specific Structure of Capacitor 41>

In the capacitor 41 shown in FIG. 5, the laminate 42 had a dimension of 10 mm×10 mm×approximately 1.0 mm (thickness) and was obtained in such a way that the glass ceramic green sheets were laminated to each other and fired. At the center of the laminate 42 in the thickness direction, the capacitor electrodes 43 and 44 were disposed.

<Specific Structure of Capacitor 51>

In the capacitor 51 shown in FIG. 6, the laminate 52 had a dimension of 10 mm×10 mm×approximately 1.0 mm (thickness) and was formed in such a way that the glass ceramic green sheets and the magnetic ceramic green sheets were laminated to each other and were then fired. More particularly, the composite laminate 52 had a multilayer structure in which as shown in FIG. 6, two second ceramic layers 54 each having a thickness of 0.5 mm were provided so as to sandwich a first ceramic layer 53 having a thickness of 20 μm. The first ceramic layer 53 was obtained by sintering the glass ceramic green sheets, and the second ceramic layer 54 was obtained by sintering the magnetic ceramic green sheets. The capacitor electrodes 43 and 44 were each disposed along the interface 55 between the first ceramic layer 53 and the second ceramic layer 54.

In addition, this capacitor 51 satisfies the conditions in which the interface 55 between the first ceramic layer 53 and the second ceramic layer 54 is present on the path of current flowing between a pair of the terminal electrodes 45 and 46.

(4) Measurement of Insulating Resistance

Before the insulating resistance was measured, the sintered conditions of the laminate 42 for the capacitor 41 shown in FIGS. 5(A), 5(B), and 5(C) was investigated, and as shown in Table 2, Samples 1, 8, 15, and 20 were "not sintered". According to the samples described above, the composition of the glass ceramic material shown in Table 1 was out of the range of the present disclosure. In more particular, in Sample 1, the content of $K_2O$ in the glass was less than 0.5 percent by weight. In Sample 8, the content of $B_2O_3$ in the glass was less than 10 percent by weight. In Sample 15, the content of $SiO_2$ in the glass was more than 85 percent by weight. In Sample 20, the filler amount was more than 60 percent by weight.

The capacitor 51 having the composite laminate 52 shown in FIGS. 6(A), 6(B), and 6(C) was not formed using the glass ceramic materials of Samples 1, 8, 15 and 20 each of which was out of the range of the present disclosure.

Next, except for Samples 1, 8, 15, and 20, the insulating resistance (Ω) of each of the capacitors 41 and 51 was measured by an insulating resistance measurement device.

The results obtained thereby are shown by "log IR" in columns of the "capacitor 41" and the "capacitor 51" in Table 2.

TABLE 2

| SAMPLE No. | CAPACITOR 41 | CAPACITOR 51 |
|---|---|---|
| *1 | not sintered | — |
| 2 | 11.8 | 11.8 |
| 3 | 11.1 | 10.9 |
| *4 | 10.8 | 8.6 |
| 5 | 10.9 | 10.7 |
| 6 | 11.7 | 11.7 |
| *7 | 11.9 | 9.5 |
| *8 | not sintered | — |
| 9 | 11 | 11 |
| 10 | 10.7 | 10.5 |
| *11 | 10.7 | 8.3 |
| *12 | 10.9 | 8.9 |
| 13 | 11.1 | 11.1 |
| 14 | 11 | 10.9 |
| *15 | not sintered | — |
| *16 | 11.6 | 9.3 |
| 17 | 11.4 | 11.4 |
| 18 | 11.1 | 10.9 |
| *19 | 11 | 8.5 |
| *20 | not sintered | — |
| 21 | 10.5 | 10.5 |
| 22 | 11.8 | 11.5 |
| *23 | 11.7 | 8.2 |
| 24 | 11.5 | 11.5 |

In Samples 2, 3, 5, 6, 9, 10, 13, 14, 17, 18, 21, 22, and 24, each of which was in the range of the present disclosure, the following conditions are satisfied as shown in Table 1.

(1) In the glass, the contents of $K_2O$, $Al_2O_3$, $B_2O_3$, and $SiO_2$ are in ranges of 0.5 to 5 percent by weight, 0 to 5 percent by weight, 10 to 25 percent by weight, and 70 to 85 percent by weight, respectively;

(2) the content of the glass and the content of the filler containing alumina and quartz are in ranges of 40 to 90 percent by weight and 10 to 60 percent by weight, respectively; and (3) the content of the alumina contained in the filler is in a range of 1 to 10 percent by weight of the total amount of the glass and the filler.

In Samples 2, 3, 5, 6, 9, 10, 13, 14, 17, 18, 21, 22, and 24, as shown in Table 2, the "log IR" of the "Capacitor 51" including the composite laminate 52 was not so much different from that of the "Capacitor 41". From the results described above, in the samples described above, it is supposed that the diffusion of the glass component from the first ceramic layer 53 to the second ceramic layer 54 shown in FIG. 6 was suppressed, and as a result, the decrease in insulating resistance at the interface 55 between the first ceramic layer 53 and the second ceramic layer 54 and in the vicinity thereof could be suppressed. In addition, the reason the diffusion of the glass component was suppressed as described above is supposed that since the alumina functioning as the filler component contained in the glass ceramic material which was contained in the glass ceramic green sheet partially reacted with the glass during firing and was then incorporated as a part of the glass composition, the glass viscosity was increased.

On the other hand, in Samples 4, 7, 11, 12, 16, 19, and 23, each of which was out of the range of the present disclosure, the "log IR" of the "Capacitor 51" was significantly decreased as compared to that of the "Capacitor 41". In Sample 4, the content of $K_2O$ in the glass was more than 5%. In Sample 7, the content of $Al_2O_3$ in the glass was more than 5%. In Sample 11, the content of $B_2O_3$ in the glass was more than 25%. In Sample 12, the content of $SiO_2$ in the glass was less than 70%. In Sample 16, the content of the alumina in the filler was more than 10%. In Sample 19, the content of the alumina in the filler was less than 1%. In Sample 23, the content of the filler was less than 10%.

In addition, in the composite laminate 52 which is included in the capacitor 51 and which is formed using the sample in the range of the present disclosure, defects, such as cracks and peeling, were not observed.

The invention claimed is:

1. A glass ceramic material comprising:
   40 to 90 percent by weight of a glass containing 0.5 to 5 percent by weight of $K_2O$, 0 to 5 percent by weight of $Al_2O_3$, 10 to 25 percent by weight of $B_2O_3$, and 70 to 85 percent by weight of $SiO_2$; and
   10 to 60 percent by weight of a filler containing alumina and quartz,
   wherein a content of the alumina contained in the filler is 5 to 10 percent by weight of the total amount of the glass and the filler.

2. A multilayer ceramic electronic component comprising:
   a composite laminate which has a structure formed by laminating a first ceramic layer and at least one second ceramic layer having a composition different from that of the first ceramic layer and which is obtained by co-sintering of the first ceramic layer and the second ceramic layer,
   wherein the first ceramic layer is formed from a sintered body of the glass ceramic material according to claim 1.

3. The multilayer ceramic electronic component according to claim 2,
   wherein the second ceramic layer is formed from a ceramic magnetic material containing a Ni—Cu—Zn-based ferrite.

4. The multilayer ceramic electronic component according to claim 3,
   further comprising at least one pair of terminal electrodes formed on at least one external surface of the composite laminate,
   wherein on a path of current flowing between the pair of terminal electrodes, an interface between the first ceramic layer and the second ceramic layer is present.

5. The multilayer ceramic electronic component according to claim 3,
   further comprising a coil conductor provided in the first ceramic layer.

6. The multilayer ceramic electronic component according to claim 4,
   further comprising a coil conductor provided in the first ceramic layer.

7. The multilayer ceramic electronic component according to claim 5,
   wherein in the composite laminate, the second ceramic layers are laminated so as to sandwich the first ceramic layer.

8. The multilayer ceramic electronic component according to claim 6,
   wherein in the composite laminate, the second ceramic layers are laminated so as to sandwich the first ceramic layer.

9. The multilayer ceramic electronic component according to claim 3,
   further comprising: at least one pair of capacitor electrodes provided in the first ceramic layer; and a coil conductor provided in the second ceramic layer.

10. The multilayer ceramic electronic component according to claim 4,
    further comprising: at least one pair of capacitor electrodes provided in the first ceramic layer; and a coil conductor provided in the second ceramic layer.

* * * * *